United States Patent [19]

Tamura

[11] Patent Number: 4,652,107
[45] Date of Patent: Mar. 24, 1987

[54] DISTANCE MEASURING DEVICE
[75] Inventor: Shuichi Tamura, Kanagawa, Japan
[73] Assignee: Canon Kabushiki Kaisha, Tokyo, Japan
[21] Appl. No.: 809,946
[22] Filed: Dec. 17, 1985
[30] Foreign Application Priority Data Dec. 18, 1984 [JP] Japan .................. 59-267025

[51] Int. Cl.⁴ .................... G03B 3/00; G01C 3/08
[52] U.S. Cl. ............................ 354/403; 356/1
[58] Field of Search ............... 354/403; 356/1, 4; 250/201 AF

[56] References Cited
U.S. PATENT DOCUMENTS

| 4,441,810 | 4/1984 | Momose et al. | 356/1 |
| 4,470,681 | 9/1984 | Johnson | 354/403 |
| 4,575,211 | 3/1986 | Matsumura et al. | 356/1 |

Primary Examiner—William B. Perkey
Attorney, Agent, or Firm—Toren, McGeady and Goldberg

[57] ABSTRACT

A distance measuring device for a camera of the kind measuring distances to a plurality of spots within a photo-taking image plane gives accurate data of distance measurement. The device comprises in combination signal projecting means arranged to project a distance measuring signal onto the spots of the image plane one after another; signal receiving means arranged to receive a reflection signal resulting from the distance measuring signal and to produce measured distance data one after another according to the part thereof at which the reflection signal is received; and measured distance data selection means arranged to select, from among the measured distance data obtained one after another from the signal receiving means, a data fluctuating to a less degree than a predetermined value as an effective measured distance data.

12 Claims, 8 Drawing Figures

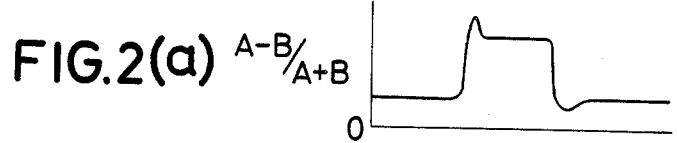
FIG.2(a) A-B/A+B
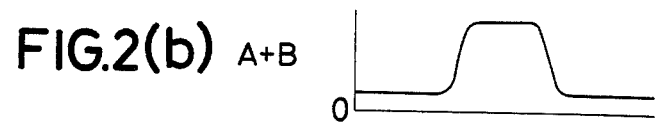
FIG.2(b) A+B
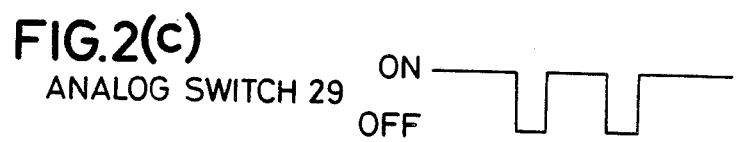
FIG.2(c) ANALOG SWITCH 29
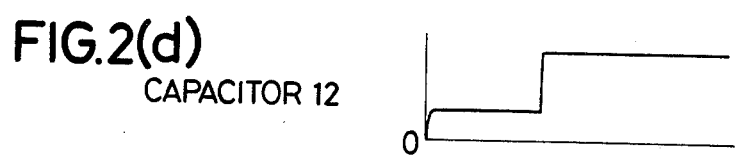
FIG.2(d) CAPACITOR 12
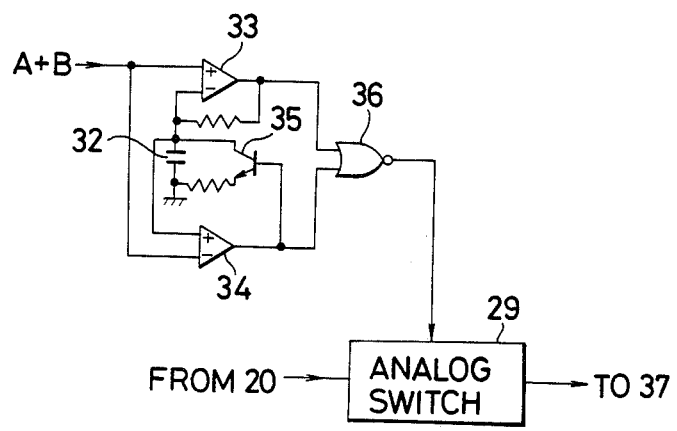
FIG.3

DISTANCE MEASURING DEVICE

BACKGROUND OF THE INVENTION

1. Field of the Invention

This invention relates to a distance measuring device for a camera capable of automatically measuring a distance to an object and more particularly to a distance measuring device arranged to permit accurate focus detection by measuring distances to a plurality of spots located within a photo-taking image plane one after another and then by selecting an effective data from among the measured distance data thus obtained.

2. Description of the Prior Art

FIG. 4 of the accompanying drawings schematically shows the arrangement of a distance measuring device for a camera which has been proposed in U.S. patent application Ser. No. 615,784 filed May 31, 1984, now abandoned, assigned to the assignee of the present invention, which corresponds to Japanese Patent Application SHO 58-97161. According to the arrangement of the device under this previous patent application, a signal light signal is projected from a light emitting element 1; a reflection light signal resulting from this is received by means of a semiconductor position detector 2; a distance to the object is obtained from a point at which the reflection light is received on the detector 2; meanwhile, a light projecting lens 3 and a light receiving lens 4 are turned round in the direction of arrow as shown in FIG. 4 in such a way as to scan the inside of a photo-taking image plane 5 with a spot light image formed by the projected light signal; and, among the measured distance data thus obtained from a plurality of spots located within the image plane 5, a data indicative of the nearest distance is, for example, employed in adjusting the focal position of a photo-taking lens. However, in the distance measuring device arranged in this manner, it becomes hardly possible to obtain an accurate measured distance data when the projected light spot image comes to an edge portion of the object or a boundary area thereof where the reflection factor of the object or the like greatly varies during the scanning process. In other words, in that event, the incident position on the semiconductor position detector 2 of a reflection light signal coming with the projected light reflected by the object according to the principle of triangulation varies according as the object distance varies. In that event, the semiconductor position detector 2 detects the position of the center of gravity of the reflected light spot image (position of a weighted mean) as the incident position and a measured distance data is obtained on the basis of this incident position. Referring to FIG. 5, let us assume that a reflection light spot image incident on the light receiving surface 2a of the semiconductor position detector 2 becomes as indicated by a circle P when the whole of the projected light spot image is reflected by the object. Whereas, when an edge part of the object between the object and the background which does not reflect the projected light comes to be scanned with the projected light spot image, it is only, say, one half of the spot image that is reflected by the object. In that event, the reflected light spot image incident upon the surface 2a of the detector 2 becomes as represented by a hatched portion of the image P. In that event, despite of the fact that the reflection light comes from the same object to be photographed, the center-of-gravity position of the reflection light spot image shifts from a point W1 to another point W2. Accordingly, the incident position of the reflection light also changes to make an accurate measured distance data hardly obtainable. The same problem arises during a scanning process on an object having a part where its reflection factor greatly varies.

The above-stated problem sometimes arises also with the conventional devices of the kind measuring only a distance to an object located in the middle part of the image plane. This problem can be solved by always bringing the object within a distance measurement range set in the middle part of an image plane in carrying out distance measurement, though it brings about another problem in terms of operability of the device. Meanwhile, in the case of the device of the kind arranged to measure distances to a plurality of spots located within a phototaking image plane, the above-stated problem of possible erroneous distance measurement is almost unavoidably encountered during the scanning process.

SUMMARY OF THE INVENTION

This invention is directed to the solution of the above-stated problem.

It is, therefore, an object of this invention to provide a distance measuring device for a camera of the kind measuring distances to a plurality of spots located within a photo-taking image plane which is capable of preventing any erroneous distance measurement and comprises: signal projecting means for projecting a distance measuring signal onto spots located within a photo-taking image plane one after another from one side to the opposite side of the image plane; signal receiving means arranged to receive a reflection signal resulting from the distance measuring signal and to produce measured distance data one after another according to the part thereof at which the reflection signal is received; and measured distance data selection means arranged to select, from among the measured distance data obtained one after another from the signal receiving means, a data fluctuating to a degree less than a predetermined value as an effective measured distance data.

The above and further objects and features of this invention will become apparent from the following detailed description of preferred embodiments thereof taken in connection with the accompanying drawings.

BRIEF DESCRIPTION OF THE DRAWINGS

FIG. 2(a) is a wave form chart showing the output of a division circuit included in FIG. 1.

FIG. 2(b) is a wave form chart showing the output of an addition circuit of FIG. 1.

FIG. 2(c) a time chart showing an analog switch of FIG. 1.

FIG. 2(d) shows a process of charging a capacitor of FIG. 1.

FIG. 3 is a circuit diagram showing another example of arrangement for detecting variations of the output of the addition circuit of FIG. 1.

DETAILED DESCRIPTION OF THE PREFERRED EMBODIMENTS

Figure 1:
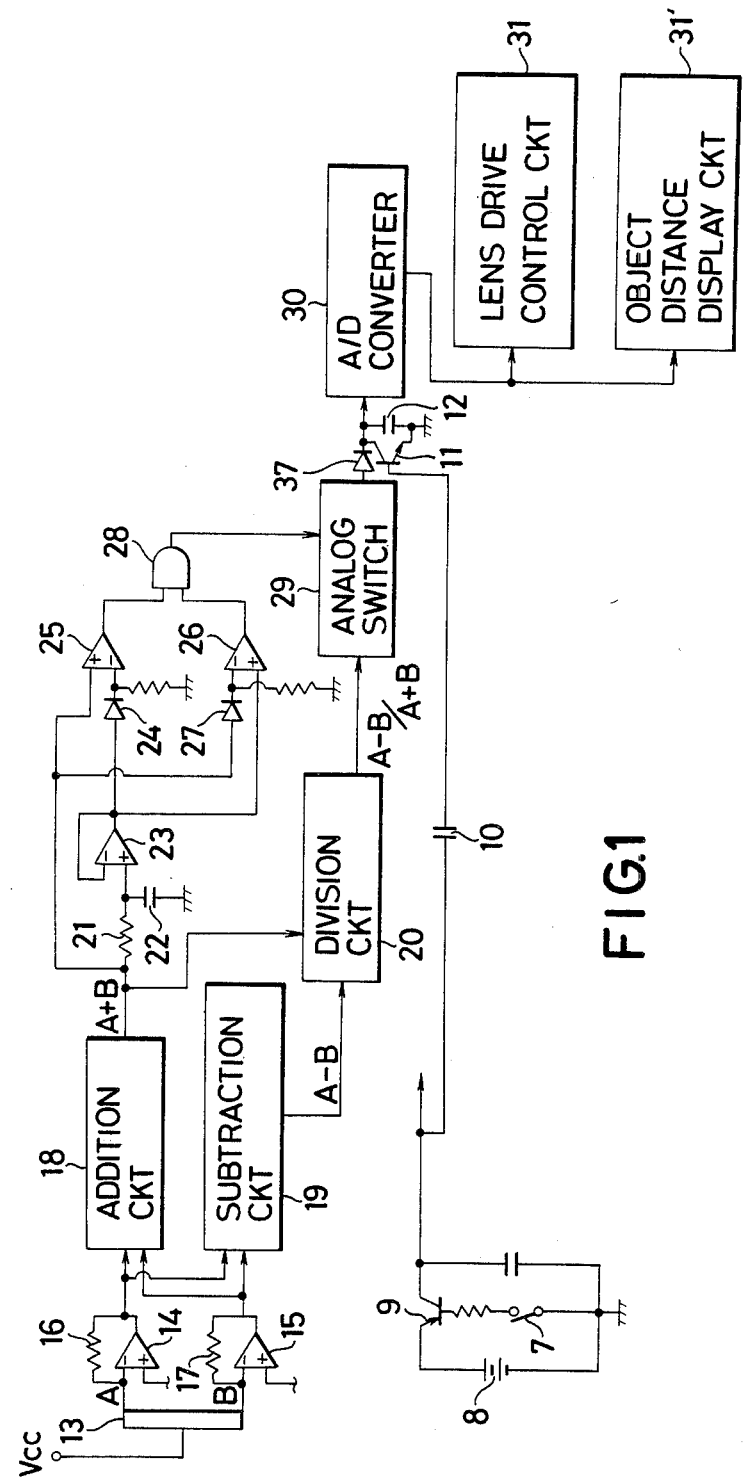
FIG. 1 is a circuit diagram showing an embodiment of this invention.
Figure 4:
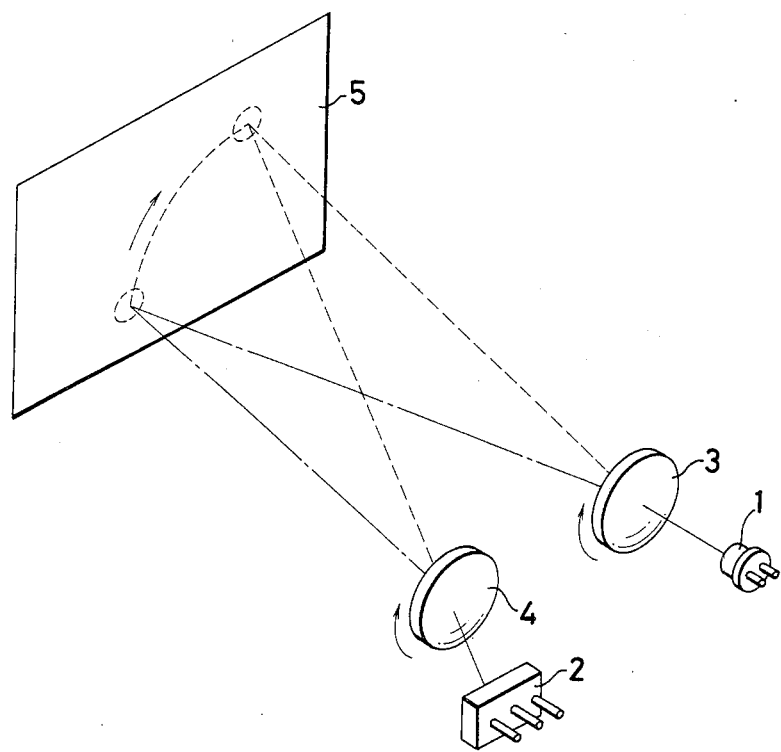
FIG. 4 is an illustration schematically showing an example of the prior art arrangement for measuring distances to a plurality of spots located within a photo-taking image plane.
Figure 5:
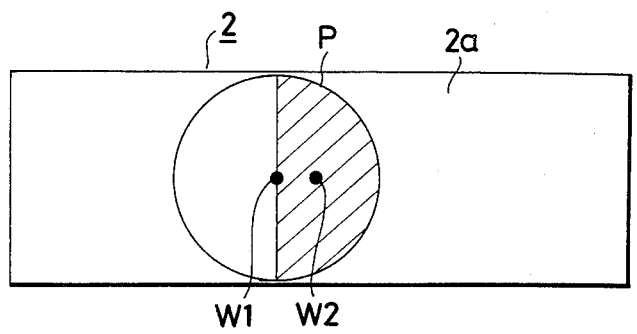
FIG. 5 is an illustration showing the light receiving part of the distance measuring arrangement of FIG. 4.

The details of this invention are as described below with reference to the accompanying drawings:

FIG. 1 is a circuit diagram showing an embodiment of this invention. When a shutter button which is not shown is pushed, a power supply switch 7 turns on. A power supply is effected via a switching transistor 9 from a power source battery 8 to each circuit element. At the same time, a voltage is applied for a moment to the base of a transistor 11 via a capacitor 10. The transistor 11 turns on for a moment. The two ends of a capacitor 12 which is arranged to hold a measured distance signal coming from a division circuit 20 are shortcircuited. This resets the capacitor 12 into an initial state. Meanwhile, with the shutter button pushed, light projecting and light receiving lenses then turn round in response to the operation on the shutter button in the same manner as in the case of FIG. 4. A light signal produced from the light emitting element begins to scan spots within a photo-taking image plane. A reflection light signal resulting from this comes to a semiconductor position detector 13. Then, the detector 13 produces outputs A and B from its two output terminals according to the incident position of the reflection light signal which is varying every moment. The outputs A and B are respectively converted into voltages through operational amplifiers 14 and 15 and resistors 16 and 17. The voltages thus obtained are supplied to known addition and subtraction circuits 18 and 19 respectively. The addition circuit 18 produces an output (A+B) and the subtraction circuit 19 an output (A−B). These outputs are supplied to a division circuit 20. The division circuit 20 performs a dividing operation (A−B)/(A+B). As a result, the division circuit 20 produces a measured distance signal which corresponds to the incident position of the reflection light signal on the semiconductor position detector 13, i.e. which represents a distance to the object to be photographed. In this specific embodiment, the output of the division circuit 20 is arranged to increase according as the distance decreases.

Meanwhile, the output (A+B) of the addition circuit 18 is supplied to a buffer amplifier 23 via a delay circuit which consists of a resistor 21 and a capacitor 22. The output of the buffer amplifier 23 is supplied via a diode 24 to the inverted input terminal of a comparator 25 and also to the non-inverted input terminal of another comparator 26 as it is. At that time, the output (A+B) of the addition circuit 18 is also supplied as it is to the non-inverted input terminal of the comparator 25. To the inverted input terminal of the other comparator 26 is supplied the output of the addition circuit 18 through a diode 27. The comparator 25 compares the signal (not delayed) which is received at the non-inverted input terminal with the delayed signal received at the inverted input terminal thereof. The comparator 25 produces a high level signal when the former is higher than the latter by a degree more than a predetermined value, which is the dropping degree of the forward voltage of the diode 24. The comparator 26 compares the signal (delayed) which is received at its non-inverted input terminal with the non-delayed signal received at its inverted input terminal. The comparator 26 then produces a high level signal when the former is higher than the latter by a degree more than a predetermined value, which is the dropping degree of the forward voltage of the diode 27. Therefore, when the difference between the delayed signal and the non-delayed signal is less than the above-stated predetermined value, an AND gate 28 produces a high level signal. In other words, the AND gate 28 produces a high level signal only when both the comparators 25 and 26 produce high level signals. The predetermined value is set at such a value that tolerates signal variations taking place when distance measurement scanning is performed over a sufficiently large object (a circuit noise, variations in the reflection factor of the object, etc. are not considered to be included in the above-stated variations).

When the high level signal is produced from the AND gate 28, an analog switch 29 turns on. Then, the signal from the division circuit 20 comes to the capacitor 12 via the analog switch 29 and a diode 37 which is provided for the purpose of preventing a reverse current. The arrangement described is such that a maximum output value (a nearest distance data) of the division circuit 20 is held at the capacitor 12 only when the reflection light signal incident upon the semiconductor position detector 13 as a whole does not much vary. In other words, the arrangement excludes any erroneous measured distance signal that is obtained when the light signal (or signal light) greatly varies due to an edge part of the object or the like during the process of scanning, i.e. during a distance measuring process, so that the capacitor 12 can be enabled to hold an accurate measured distance data. The measured distance data which is thus held in the form of a voltage value at the capacitor 12 is converted into a digital signal by an A/D (analog-to-digital) converter 30 which is disposed at the ensuing stage. The digital signal is used for control over a photo-taking lens driving operation and also for a distance display. More specifically, a lens drive control circuit 31 is arranged to perform photo-taking lens shifting position control on the basis of the signal from the A/D converter 30. A sharp focused photographing operation can be accomplished under that position control. Meanwhile, an object distance display circuit 31' displays a distance corresponding to the adjusted focal position of the photo-taking lens.

The operation of each of the essential parts described above is briefly described below with reference to the wave-form and time charts of FIGS. 2(a) to 2(d):

Let us assume that an object of a certain size is located in the middle part of a photo-taking image plane and at a near distance while other objects are located at a certain far distance. Under this condition, the embodiment at first measures the far distance. Therefore, the output (A−B)/(A+B) of the division circuit 20 is at a low level as shown in FIG. 2(a). After that, when the distance measuring process reaches one side of the near distance object, the output of the division circuit 20 at first becomes a signal representing a nearer distance than the actual or true distance of the object. When the distance measuring process reaches the opposite side or end of the object, the output of the division circuit 20 becomes a signal representing a farther distance than the true distance of the far distance object. After that, the output becomes a signal representing the true distance of the far distance object. Whereas, in the case of the output (A+B) of the addition circuit 18, it gradually increases when the distance measuring process shifts from the far distance object to the near distance object and gradually decreases when the process shifts from the near distance object to the far distance object as shown in FIG. 2(b). The analog switch 29 is in an OFF position only when the output of the addition circuit 18 is changing and always remains in an ON position with the exception of the changing period as shown in FIG. 2(c). Therefore, the capacitor 12 holds a maximum value obtained as the distance data of the nearest object while the analog switch 29 is in the ON position, that is, in case of no variation in the measured distance data as shown in FIG. 2(d).

FIG. 3 shows another example of the circuit arrangement (consisting of elements from the resistor 21 to the AND gate 28) for detecting the variations of the output (A+B) of the addition circuit 18. The operation of this modification is as follows: The output of the addition circuit 18 is compared with a voltage with which a capacitor 32 is charged when the power supply is switched on. If the voltage of the capacitor 32 is found lower than the output of the addition circuit 18, the output level of a comparator 33 becomes high. This causes the capacitor 32 to be further charged until the voltage thereof reaches the same level as the output of the addition circuit 18. If, on the contrary, the voltage of the capacitor 32 is found higher than the output of the addition circuit, the output level of another comparator 34 becomes high. The high level output of the comparator 34 turns on a transistor 35 to shortcircuit thereby the capacitor 32. As a result, the voltage of the capacitor 32 is discharged until it becomes the same level as the output of the addition circuit 18. Therefore, when the output of the addition circuit 18 is trending upward during the distance measuring process, the output level of the comparator 33 becomes high and the capacitor 32 is charged. When the output of the addition circuit 18 comes to trend downward, the output level of the comparator 34 becomes high and the capacitor 32 is discharged. The offset voltages, etc. of the comparators 33 and 34 are, therefore, adjusted in such a manner that the output levels of the comparators 33 and 34 become low when the output of the addition circuit 18 is in a constant state (fluctuates within a predetermined range). With the comparators adjusted in this manner, the output level of a NOR gate 36 becomes high only when the output of the addition circuit 18 is not varying. Then, the analog switch 29 remains in its ON state while the output of the NOR gate 36 is at a high level.

In accordance with the arrangement of this embodiment, in case that the output of the addition circuit 18 varies to a great extent with the projected light spot image coming partly off the surface of a main object, or when it comes to an edge part or the boundary of a high contrast part of the main object to be photographed, any erroneous measured distance data that is obtained on that occasion is not transmitted from the division circuit 18 to the capacitor 12. Therefore, erroneous distance measurement can be prevented to permit extremely accurate focusing.

In this embodiment, the measured distance data selecting means of this invention comprises a set of circuit element from the resistor 21 to the analog switch 29 of FIG. 1 and from the analog switch 29 and the capacitor 32 to the NOR gate 36 of FIG. 3. This specific embodiment is arranged to use, as the result of distance measurement, the data of the nearest distance among many measured distance data continuously obtained by distance measuring scanning process. In accordance with this invention, however, this arrangement may be replaced with a different arrangement using either the farthest distance data or an average distance data as an effective measured distance data instead of the nearest distance data.

Further, in this embodiment, the scanning process is performed on the objects within a photo-taking image plane by rotating the light projecting lens and the light receiving lens. However, that arrangement may be replaced by any other image plane scanning arrangement. For example, the photo-taking image plane may be scanned with many light projecting elements arranged to be switched over from one to another. Further, it goes without saying that this invention is applicable even to a distance measuring device of the type not measuring the distances of a plurality of spots located within the photo-taking image plane as long as the device is arranged to obtain a measured distance data by scanning the image plane.

In accordance with this invention as described in the foregoing, there is provided the measured distance data selecting means which is arranged to select, from among the measured distance signals obtained during the distance measuring process, a measured distance signal fluctuating to a less degree than a predetermined value and to use it as an effective measured distance data. The invented arrangement eliminates such an error of the measured distance signal that arises at the boundary of the object. The invented arrangement, therefore, gives extremely accurate measured distance data and thus brings about a highly advantageous effect.

Furthermore, since the gist of the present invention is to provide an arrangement such that a distance measuring signal fluctuating to a great degree is voided to perform an accurate distance measurement, means for detecting a distance measuring signal fluctuating to a great degree may be embodied in various manners. For example, instead of the measured distance data selecting means shown in the above embodiment, a low-pass filter may simply be provided in front of the A/D converter 30, operating as the means for detecting a distance measuring signal fluctuating to a great degree.

What is claimed is:

1. A distance measuring device for a camera of the kind measuring distances to a plurality of spots located within a photo-taking image plane, comprising:
   (a) signal projecting means for projecting a distance measuring signal onto spots located within a photo-taking image plane one after another from one side to the opposite side of said image plane;
   (b) signal receiving means arranged to receive a reflection signal resulting from said distance measuring signal and to produce measured distance data one after another according to the part thereof at which the reflection signal is received; and
   (c) measured distance data selecting means arranged to select, from among the measured distance data obtained one after another from said signal receiving means, a data fluctuating to a less degree than a predetermined value as an effective measured distance data.

2. A device according to claim 1, wherein said measured distance data selecting means includes sampling means for sampling the quantity of said measured distance signal received by said signal receiving means.

3. A device according to claim 2, wherein said measured distance data selecting means includes discriminating means which is arranged to compare the quantity of the measured distance signal sampled by said sampling means with that of the ensuing signal received by said receiving means after sampling, said comparison being performed on said measured distance signals one after another in rotation.

4. A device according to claim 3, wherein said sampling means includes delay means.

5. A distance measuring device for a camera of the kind measuring distances to a plurality of spots located within a photo-taking image plane, comprising:
(a) signal projecting means for projecting a distance measuring signal onto spots located within a photo-taking image plane one after another from one side to the opposite side of said image plane;
(b) signal receiving means arranged to receive a reflection signal resulting from said distance measuring signal and to produce measured distance data one after another according to the part thereof at which the reflection signal is received; and
(c) measured distance data selecting means for voiding measured distance data fluctuating to a great degree in the measured distance data produced by said signal receiving means one after another.

6. A device according to claim 5, wherein said measured distance data selecting means includes sampling means for sampling the quantity of said measured distance signal received by said signal receiving means.

7. A device according to claim 6, wherein said measured distance data selecting means includes discriminating means which is arranged to compare the quantity of the measured distance signal sampled by said sampling means with that of the ensuing signal received by said receiving means after sampling, said comparison being performed on said measured distance signals one after another in rotation.

8. A device according to claim 7, wherein said sampling means includes delay means.

9. A distance measuring device for a camera, comprising:
(a) signal projecting means for projecting a plurality of distance measuring signals onto an object to be photographed;
(b) signal receiving means for receiving a signal reflected by the object onto which said plurality of distance measuring signals are projected, said signal receiving means detecting a distance to the object on the basis of said reflected signal; and
(c) measured distance data selecting means for voiding said reflected signal which is fluctuating to a degree more than a predetermined value.

10. A device according to claim 9, wherein said measured distance data selecting means includes sampling means for sampling the quantity of said measured distance signal received by said signal receiving means.

11. A device according to claim 10, wherein said measured distance data selecting means includes discriminating means which is arranged to compare the quantity of the measured distance signal sampled by said sampling means with that of the ensuing signal received by said receiving means after sampling, said comparison being performed on said measured distance signals one after another in rotation.

12. A device according to claim 11, wherein said sampling means includes delay means.

* * * * *